May 28, 1940.   V. LOUGHEED   2,202,013
REINFORCED PLASTIC AND MATERIAL THEREFOR
Filed Jan. 13, 1938
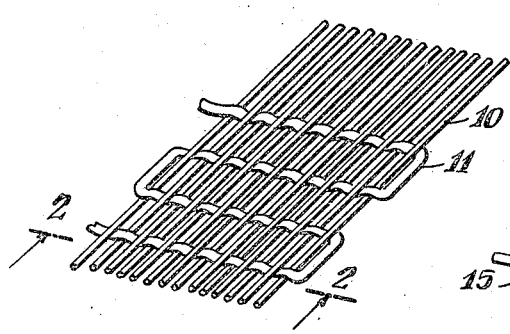
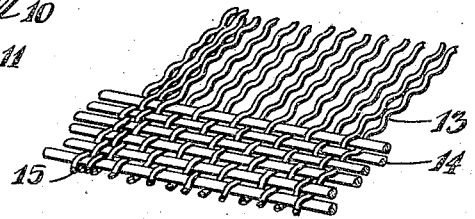
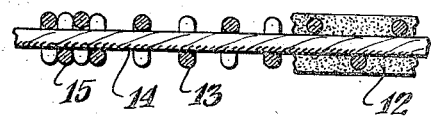
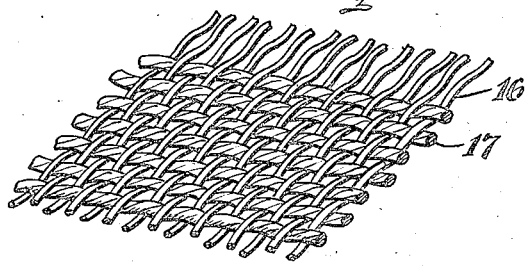
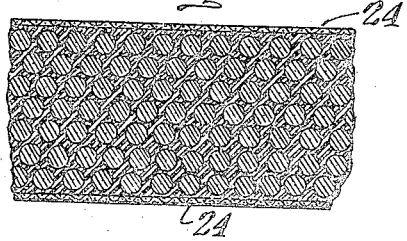
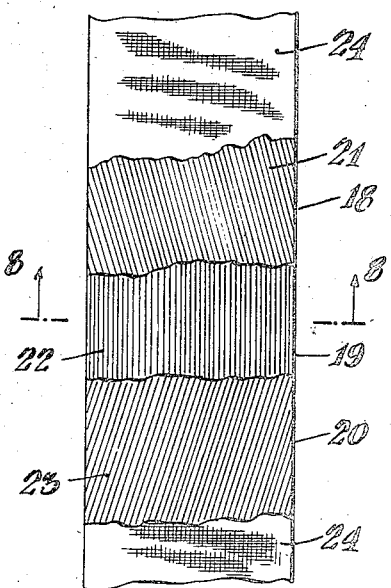
INVENTOR
Victor Lougheed
BY
Alan N. Mann
ATTORNEY Patented May 28, 1940

2,202,013

UNITED STATES PATENT OFFICE 2,202,013

REINFORCED PLASTIC AND MATERIAL THEREFOR

Victor Lougheed, Lucketts, Va.

Application January 13, 1938, Serial No. 184,797

4 Claims. (Cl. 18—59)

My invention relates to reinforced plastic materials and more particularly to reinforced natural or synthetic resins having embedded therein a large number of small wires as reinforcing elements.

It is recognized that resins in general and certain other plastics are not too high in resistance to compression stresses, and possess relatively low tensile strength, as compared with the metals. For this reason, various means of reinforcing the resins to increase their tensile and other strength characteristics have been tried, including the use of paper, fabrics, metal rods, wire, and the like. This is accomplished and proved, but has been subject to very definite limitation that has restricted the commercial use of these materials, particularly in air propeller blades for which they have been proposed.

When cloth or other yielding fabric made of organic fiber is used as a reinforcing element in the plastics, the intended increase in strength by the fabric is not realized and the reinforced material will break under relatively low loads. For this reason, the products which have been proposed heretofore, consisting of sheets of fabric molded in phenol-formaldehyde resins commonly known as Bakelite, and in other resins, have not been successful, particularly when used in the manufacture of air propeller blades designed for large propeller diameters and to operate at the present high centrifugal loadings and power outputs. For example, a common form of phenol-formaldehyde resin has a maximum breaking strength of approximately 10,000 pounds per square inch. This resin when reinforced in any way with any organic or other fabric has a breaking strength which is practically always less than about 25,000 to 30,000 pounds per square inch, a figure which is still inadequate to meet the centrifugal and other stresses encountered in present air propeller blades, or in other possible applications of such materials subjected to similarly high stresses.

In the prior attempts to use metal rods or metallic wire as reinforcing elements, it has proved difficult to bond or engage the wire securely to the plastic. The result is that the plastic slips off of the wires or the wires pull out of the plastic. In either of these cases, the wire will not assume the load and the reinforced plastic material will have about the same breaking strength, or sometimes even less than that of the plastic alone.

One of the reinforced materials heretofore proposed consists of plastic material having embedded therein as a reinforcing element, wire mesh, that is, a plurality of wires crossing one another through being arranged in some definite weave or interlocking pattern. The failure of such reinforcement to withstand conditions of high stress seems to be due to the individual wires rubbing against each other at their points of contact, through the effects of intermittent stress or vibration. This causes the wires to chafe away at their contacting points until they finally fail, thus losing their effectiveness as reinforcing elements. Another difficulty with reinforcement by ordinary wire-mesh, such as screen wire in which the wires cross each other at an angle of about 90°, is that there is no adequate bond between the wire surfaces and the adjacent surfaces of the plastic. Both surfaces being ordinarily very smooth, there is nothing to hold the two together but friction, the coefficient of which in this case is small, especially since the wire and plastic are not pressed together appreciably under the conditions that prevail after the article is removed from the mold and placed into use.

In addition to the above mentioned examples of unsuccessful prior art materials, there have been many other attempts made for reinforcing plastics with various kinds of metallic and non-metallic inserts. Regardless of the theories advanced in favor of these various combinations, however, there has not been produced prior to the present time any reinforced plastic material having reinforcing oriented elements substantially parallel to the directions of stress and at the same time conferring added strength sufficient to permit safe use of the reinforced material in air propeller blades and other structures where similar high stresses are involved.

I have studied this problem with the aim of making a resinous body which can be molded and which will have the enormous tensile strengths, in relation to the mass (which is a basic factor of the centrifugal stresses) necessary to withstand the stresses that are involved in the operation of the blades of a modern air propeller. Today, the only satisfactory types of propellers on the market for use with high powered engines have blades forged each of a single solid piece of aluminum or magnesium alloy, but even these have to be watched, reinspected, and reconditioned very carefully, since even the slightest scratch on the surface, as from weeds or grass, tends always to develop by fatigue into an increasing crack until some part of the blade flies off, so unbalancing the engine even though only a small tip portion be lost, that a serious accident almost unfailingly results. The maximum strength of the reinforced resinous bodies heretofore suggested have nowhere near the strength required to meet this problem, except under low power loadings.

To obtain very high tensile strengths, I have found it most advantageous to use as the plastic reinforcing medium high tensile strength small diameter wire such as the product known as music wire, which is a familiar type of cold-drawn wire, of high carbon steel, though the best of it contains very small percentages of nickel. Such wire in small diameters may show ultimate tensile-strength values ranging up to approximately 500,000 pounds to the square inch of cross section, which, with a density of 7.9, makes it the strongest known material, in weight-strength ratio.

I have discovered that if one employ this strong wire, and provide the required total cross section in the form of an aggregate of a great many small wires, each of very small cross section, a new and useful effect is gained, heretofore unrecognized and unavailable. For in such case, there is a great increase in the total surface in proportion to the total cross section, when multiple wires of this type are systematically embedded in a molded resin, with the result that at and below certain critical values of wire sizes, there is obtained a compound body which from the point of view of tensile strength becomes in effect a homogeneous mass in that substantially the full strength of the wires is realized, in the form of the hold between them and the plastic, so that the resin shows substantially no tendency to move on the surface of the wire when exposed to the action of forces up to the limits of strength of the wire. The difference in effect between the wires that I contemplate using, which for the most-stressed portions of an air propeller blade should be about 0.008 inch in diameter, or finer, bears a relation to the use of ordinary wires, which may be compared with the effects on solid matter of reducing it to microscopic size, whereupon the vastly increased surface confers upon the material such totally new effects that the formerly solid material is said to be "colloidal."

With wire thus used, below the critical size, it becomes possible to get adherence between the wire and a surrounding resinous mass such that, if the wire be embedded in the resin for even less than one inch, despite its great unit strength it will break before it will pull out of the material. It is possible that this may be due not alone to the actual increase in friction but also to the fact that, with the wires of sufficiently small diameter, the increased surface relative to the cross-sectional area becomes so great that the resin may serve to prevent otherwise-normal elongation of the wire which must tend to produce a progressive freeing of the surface. For, if one use a relatively-soft wire of large daimeter it has been found that upon stress being exerted, there ensues a progressive elongation and release of the wire, freeing the wire from its embedding material. I reason, therefore, that the poorer adherence with large wires is not altogether a function of the small area of contact but is a combination of bad factors of cross-sectional area and embedded length. In the case of very fine wires, on the other hand, the matter of embedded length seems very quickly to reach a substantial equilibrium, beyond which additional embedded length makes relatively little difference.

As a result of this discovery, I have been able to provide for the first time reinforced plastic bodies of such enormous tensile strength that they are suitable for use in large, heavily-powered, high-speed air propeller blades. In applying my discovery it is essential that there be used large numbers of the very fine wires, particularly towards the blade surface and tip, and these are preferably, and certainly most easily, introduced into the plastic mass as prearranged aggregates. It is important that the wires should not rub against one another with appreciable pressure, and that they should not be weakened by any type of permanent deformation, such as roughing, flattening, or bending to a positive "set."

In accordance with one illustrative embodiment of my invention, I have found that a reinforced plastic material which overcomes all of the disadvantages of the prior-art materials may be made by utilizing as a reinforcing element for the plastic a tape or sheet consisting primarily of strong steel wires of relatively-small diameter slightly separated and held in the desired relations by means of organic-fiber threads interwoven with the steel wires. I have found that steel music wire may be used most advantageously for the reinforcing element, with cotton thread interwoven with the small steel wires in such a way as to hold unit groups, each of a very large number of fine wines, relatively closely together but at the same time actually separated or substantially out of hard physical contact with each other. One of the principal practical advantages of this type of reinforcing material is that the wires can be readily handled through a molding procedure and made to become a highly effective reinforcement of a mass of any plastic, such as synthetic resin or any suitable substitute material. Thus, in a narrower phase my invention contemplates a mass of molded plastic material in which are embedded the exceedingly fine wires preaggregated into a web or tape. An incidental advantage and feature of my invention is that the reinforcing wires surprisingly increase not only the tensile strength but also resistance to impact of the mass of plastic, without proportionately increasing its specific gravity.

In general, this reinforcing element characteristic of my invention is constituted primarily of a very large number of fine parallel wires each arranged as one of the elements of a web, the other element of which is an organic fiber thread, which may be either the weft or woof thread. The fiber threads may be so interwoven with the steel wires as to hold them until molded in slightly-crinkled form, but without permanent set, so that when the reinforced plastic material is subjected to loading in a direction occasioning stress in approximate parallelism with the wires the consequent tension, tending to straighten out the wires, causes them to bear with very high pressure upon the plastic that surrounds them, whereby a maximum frictional resistance of the wires to drawing out of the surrounding plastic is obtained. One of the important distinctions between this type of reinforcing element and that of the prior art wire reinforcing schemes is that the wires must be very small, under a certain critical value in each case, of surface area to cross section. That is, for example, for air propeller bodies and tips they should have relatively small diameters, preferably not exceeding 0.003 to 0.008 of an inch. When such fine wires are used their smallness is of course compensated for by their great numbers, whereby for the requisite cross section the surface area of contact between the wires and the plastic is far greater than that obtainable with the relatively large wires heretofore used. There is in each design case a critical relationship between the required diameter of the wire, the coefficient of friction of the given plastic, and the loading, in accordance with which if this required diameter or smaller be used, the structure withstands the loading, whereas if a larger be used, the structure will invariably fail.

The case seems to be that with inadequate surface, due to too great wire coarseness, there is inadequate adhesion between the metal and the plastic, wherefor, above the critical diameter, failure occurs due to the wire and plastic slipping apart, whereas below the critical diameter no slippage can occur, only failure of the wire by actual breakage through loading past its yield point. The essential feature consequently is that at all points within the reinforced structure the frictional resistance to each wire to pulling out of the plastic around it must be greater than the breaking strength of each wire.

The novel features of my invention are set forth with particularity in the appended claims, the invention itself however, both as to organization and method of operation will be clearly understood from the following description taken in conjunction with the accompanying drawing, in which Fig. 1 is an elevational perspective view of a fragment of the reinforcing steel-wire-organic-fiber material, in the form of a selvedge-edged tape;

Fig. 2 is a cross sectional view of the material shown in Fig. 1 with the addition of a coating of plastic, or plastic varnish over a portion of the material;

Fig. 3 is an elevational perspective view of a different arrangement of the steel wires and organic fiber, the fiber being straight and the wires bent, in contrast to the reverse condition shown in Fig. 1;

Fig. 4 is a sectional view of the material in Fig. 3 showing also in part a coating of plastic on this material;

Fig. 5 is an elevational perspective view of the reinforcing material in which both the steel wires and organic fibers are bent;

Fig. 6 is a cross sectional view of the material shown in Fig. 5, with, in part, a coating of plastic material thereon;

Fig. 7 is a plan view partly broken away of a composite material containing several laminations of the reinforcing sheet material; and Fig. 8 is a sectional view taken along line 8—8 of Fig. 7.

Referring now to the several figures in the drawing, substantially in the order in which they occur, the reinforcing material or tape in Fig. 1 is made up of a plurality of fine parallel straight wires 10 which are definitely held apart from any actual contact with each other by means of an interwoven organic fiber thread 11 which, for example, may be cotton thread. Since there is thread positively spacing apart each pair of wires, and there is no cross weaving of the wires themselves, they have no intersecting metal-to-metal contact points and therefore cannot chafe or cut each other when subjected to stresses in use. Furthermore, the fiber thread 11 so separates the wires that there is very little chance of positive contact even between adjacent layers of tape. The practical advantage of this type of assembly as well as all of the others shown in the drawing is that it can be placed in a mold containing plastic and easily and permanently molded into the plastic under high pressure and at the softening or polymerizing temperatures without the wires becoming displaced to any objectionable degree.

In Fig. 2, a portion of the reinforcing material shown there in section is impregnated and coated with a plastic material 12 which may be of any suitable type either thermosetting or thermoplastic, such as, for example, the phenol-formaldehyde resins, urea resins, casein resins, acrylic resins, or suitable cellulosic plastic materials. Likewise the wire shown in this figure as well as in all of the other figures may be any suitable strong steel wire, one of the most excellent examples of which is the best German music wire, drawn from Swedish steel. The reason I prefer to prepare the reinforcing material of my invention by precoating or lacquering it with plastic or plastic-base material, as indicated by the coating 12 in Fig. 2, is that after thus coating with plastic the coated product can be heated to the suitable temperature to polymerize or soften the plastic during the molding, so that when thus finally formed under pressure it will aggregate into a unitary, integral mass. Such coated material may be prepared in narrow widths such as are commonly used as tapes, or it may be made up in the form of sheets of any desired width.

In Fig. 3, the reverse of the arrangement shown in Fig. 1 is used, that is, the crinkled steel wires 13 weave over and under the straight cross threads of fiber 14. For the sake of illustrative clarity, these elements have been shown appreciably separated in the main part of Fig. 3 but in actual practice in this type of weave the wires can be compacted too close together, in contact as shown at 15.

In Fig. 4 the cross sectional appearance of the plastic material in Fig. 3 is given, and at one end the coating of plastic 12 as described above in connection with Fig. 2 is shown.

In Fig. 5 is shown a preferred arrangement of the wires and fiber threads, which Figs. 1 and 3 serve chiefly to help explain. As shown in Fig. 5, the wires 16 and the organic fiber threads 17 are both bent; combining certain fabrication features of Figs. 1 and 3. The reason that the material shown in Fig. 5 is on the whole to be regarded as a preferred form is because it not only separates the wires, as in Fig. 1, but presents great resistance to the wires pulling out of the plastic, as do the wires of Fig. 3. The wires of Fig. 5 are not permanently bent, but remain in the bent or crinkled form while prearranged in the fabric, only because of the pressure against them of the taut fiber threads 17. Thus when finally molded they still retain their crinkled form, without permanent set, because they are held deformed by the surrounding plastic. In Fig. 6, which is a cross section of the material in Fig. 5, a portion of the material is shown covered with a coating of plastic material 12.

It will be understood that the organic fibers shown in Figs. 1 to 6 and described above are used only for the purpose of holding the wires systematically aggregated in either straight or bent form and in the desired relative placements while they undergo incorporation in the plastic mass, and coating with the plastic coating material.

These relatively few organic fibers can offer little effective resistance to the stresses to which the reinforced material is subjected in use, the wires being depended upon to support these stresses.

In Figs. 7 and 8, there is illustrated in plan and section respectively, a mass type of plastic material in which a number of the tapes or sheets of reinforcing material such as shown in Figs. 1, 3, and 5 are superimposed to reinforce the entire mass. The number and arrangement of these sheets used will of course depend upon the thickness and form of the final material or object desired, and the strength resistances and orientations required from such material or object. In Fig. 7, there is illustrated by way of example only three sheets 18, 19 and 20 of the reinforcing material. It will be noted that these sheets may be so arranged that the reinforcing wires shown generally at 21 are slightly crossed, at acute angles, with the wires shown generally at 22 in the sheet 19 and the same is true of the wires shown generally at 23 in sheet 20. As a weather and surface protecting covering for this laminated material a sheet of fabric 24, such as for example canvas, may be used to cover one or both exposed surfaces of the laminated material, this outer fabric covering also being suitably precoated by lacquering to bond integrally under heat and pressure into the rest of the mass. It will be understood that in addition to or admixed with the wire-organic fiber reinforcing sheets, other reinforcing sheets, such as paper, cloth, etc., may be used.

Under adequate molding pressure, no matter what the initial arrangement as in Fig. 7, it will be found that the wires will rest between one another, in a multiple hexagonal pattern, as shown in the cross section of Fig. 8.

An important feature of the reinforcing material of my invention is that the tensile strength of the wires is not harmed in any way by the fabrication of the reinforcing sheet or its incorporation in the plastic material. I have found that the high grade qualities of steel music wire, which I prefer to use, are exceedingly susceptible to loss of strength if they are given any permanent deformation, or are used in any other manner than in substantially straight or slightly waved, smooth lengths as they come from the drawing dies. If, for example, these wires are permanently bent instead of being simply held in the generally moderately deformed extension indicated in the drawing they will suffer a marked decrease from their normal tensile strength. I have found also that the strongest quality of wires for use in my invention are those of ordinary carbon steel, unalloyed except perhaps in some instances with a very small amount of nickel. The great strength of these small wires seems to be definitely consequent upon the cold working through the drawing dies by which they are manufactured. Since drawing cold works the surface most effectively, it affects a greater proportion of the total cross section in smaller wires than it does in larger wires, hence it is found that the smaller wires afford the maximum tensile strengths. For example, these wires ranging in diameter from about 0.003 of an inch to about 0.008 of an inch may have tensile strengths ranging from just below to just above 500,000 pounds to the square inch. This normal initial strength will be reduced easily as much as 100,000 pounds to the square inch if the wire be given any permanent deformation, or if its surface be roughened as by bending or twisting to a permanent set, or by rolling or flattening, with a mistaken idea of securing a better bond between it and the plastic with which it is associated. I have also found that round wires have a greater effective strength in the plastics than other shaped wires.

What actually occurs as the size of wire is reduced and the number of wires correspondingly multiplied, in a reinforcing system to be surrounded by plastic, is very difficult to define exactly, because it so clearly seems to be a composite of a good many variables involving the elastic yield within the elastic limit of the wire under tension; the elastic yield of the wire under compression within the limit of its permanent deformation or crumbling of the plastic, the portion of length of the wire relative to the size of the wire which is embedded within the plastic, within any given zone of stress; the presence of a moderate degree of waviness in the wire insufficient premanently to deform it, but productive, under a pull that tends to straighten it out of consequent high pressure and therefore greater breaking effect against the contacting plastic; and the constitution of the plastic itself.

However, it can be positively defined, for example, that a music wire having an area of approximately 1/50000 square inch and approximately 490,000 pounds to the square in ultimate strength, embedded to a distance of not less than 1/2 inch in the phenol-formaldehyde type of plastic known as Bakelite and molded thereon under molding pressure adequate to eliminate the possibility of voids, will not pull out under a traction of 10 pounds, which will be sufficient to break the wire.

Doubling the diameter of the wire with the consequence of quadrupling its cross section, while only doubling its surface with the half inch depth to which it is inserted in the Bakelite, might appear capable of being compensated for by doubling the depth of insertion, as from 1/2 inch to 1 inch, thus maintaining the original relationship of area of surface to area of cross section. Within limits this is true, but it is not so over an indefinite range, for which reason if the wire size be made larger than some definite limit, determined by the interrelations of the various complex factors mentioned above, the wire would pull out, or what amounts to the same thing, the Bakelite will crumble off and the whole attempt to secure reinforcement thereby fail.

Conversely, in any given case as the size of the wire is decreased thus increasing the surface area and multiplying the number of wires which must be provided to maintain the initial wire cross section, definite points of demarcation invariably are reached dependent most positively upon size or textural factors, below which the reinforcemen is good, and above which the attempt to obtain it is futile.

It will be understood that the types of materials, and sizes and means of arranging the materials, as described hereinbefore are subject to various modifications and changes within the scope of my invention, as has been explained and suggested.

I claim:

1. A reinforced plastic material comprising a hardened rigid mass of plastic and a multitudinous number of fine steel wires embedded in said plastic without appreciable contact between wires, each of said wires having a diameter not substantially greater than 0.008 inch.

2. A reinforced plastic material comprising a hardened mass of phenol-formaldehyde resin and a reinforcing sheet molded therein, said sheet comprising a plurality of substantially parallel steel wires each having a diameter of approximately 0.003 to 0.008 of an inch and a plurality of cotton threads interwoven with said steel wires to hold them in place and prevent wearing contact between adjacent wires.

3. A reinforced plastic material comprising a mass of hardened plastic reinforced by a substantially-parallel, non-intersecting system of embedded wires which have an inherent coefficient of friction between themselves and said plastic, the diameter of each of said wires being not greater than about 0.008 inch, the geometric relationship between the surface area and the cross section of each wire being such that the wires have a total surface adhesion to said plastic greater than the breaking strength provided by the cross section of all of the wires.

4. A reinforced, hardened plastic material for use in air propeller blades and having a tensile strength of at least 100,000 pounds per square inch and ranging up to about 500,000 pounds per square inch, comprising a mass of hardened plastic and embedded therein a reinforcing web made of a multitudinous number of fine, strong, steel wires spaced apart and arranged so as to extend in substantially the same direction and without crossing of wires, and a plurality of non-metallic threads interwoven with said steel wires to hold them in place and prevent wearing contact between adjacent wires but without permanent deformation of said wires, said fine steel wires having such a large surface area in contact with the surrounding hardened plastic that the frictional resistance to separation between each of said wires and plastic at all points in the reinforced material is greater than the breaking strength of each wire.

VICTOR LOUGHEED.